Aug. 4, 1931.   H. E. SIPE   1,817,775

METALLIC COUPLING DEVICE

Filed June 20, 1928

INVENTOR
Harry E. Sipe
BY
Howard E. Thompson
ATTORNEY

Patented Aug. 4, 1931

1,817,775

UNITED STATES PATENT OFFICE

HARRY E. SIPE, OF NEW YORK, N. Y.

METALLIC COUPLING DEVICE

Application filed June 20, 1928. Serial No. 286,926.

This invention relates to coupling devices for coupling two or more bodies or parts together, and particularly to metallic devices of this class; and the object of the invention is to provide a metallic coupling involving a plurality of elastic members capable of flexing or yielding in the direction of movement of a part thereover in coupling the same with said body, placing the flexed members under compression and disposing them angularly with reference to a plane at right angles to the line of movement of the part to be coupled, thus fixedly retaining said part against displacement from said body when subjected to stress or strain in a direction opposite to the coupling movement thereof; a further object being to provide a coupling device of the class specified involving a plurality of elastic and flexing members constituting a part of the unit structure of the device; a further object being to provide a coupling of the class described for coupling pipes, tubes and the like, the diameter of the elastic or flexing members of which is slightly greater than the inside diameter of the pipe or tube to be coupled therewith; a still further object being to provide a coupling of the class described, the flexing and elastic coupling elements of which may be in the form of disks, rings or the like arranged on a mounting body or shaft in juxtaposition or in spaced relation and further wherein the peripheral portions of said flexing members are divided into a plurality of independently flexing sections; and with these and other objects in view, the invention consists in a device of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:—

Figure 1:
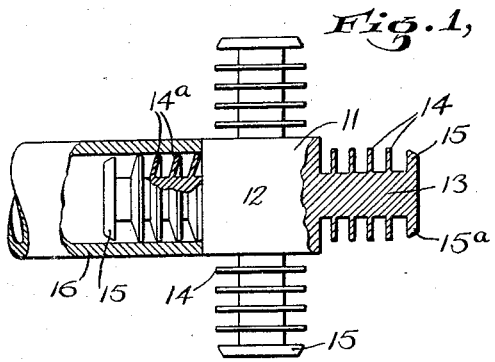
Fig. 1 is a side and sectional view of one form of coupling which I employ and illustrating the method of its use.

My improved coupling device may be of any desired shape or form and may be used for coupling body parts of any kind or class, regardless of the shape or cross sectional form thereof. For the purpose of illustrating a most complete use of the invention, I have shown in Fig. 1, a four-way coupling body 11 but it will be understood that this body may be two-way or three-way, with the coupling ends opposed or angularly extended with relation to each other, depending solely upon the relative arrangement of the parts or bodies to be coupled therewith. This will apply to the several forms of construction shown.

The coupling body 11 comprises a central portion 12 from which extends two or more pin-like bodies 13 having arranged on the periphery thereof and spaced longitudinally thereof, coupling elements 14 in the form of ribs or fins of such structure and thickness as to provide elastic properties thereto and permit of the flexing thereof, said members being formed integral with the pin-like bodies 13 in any desired manner. At the outer ends of the pins 13 are guide members 15 having beveled walls 15a for guiding a pipe or tube onto the members 14 is securing the same to the coupling body 11. It will be noted that the outside diameter of the guide member 15 is less than the corresponding diameter of the members 14, and is also slightly less than the inside diameter of a tube or pipe 16 adapted to be mounted in connection with the coupling as seen at the left of Fig. 1.

The above description as applied to one of the pin bodies 13, including the members 14 and 15 thereon, applies to all of such bodies as seen in Fig. 1 of the drawings. In mounting pipes or tubes such as shown at 16 with the respective pin bodies 13, the members 14 are flexed inwardly in the direction of the coupling movement or toward the central body 12 of the coupling in the manner shown at 14a at the left of Fig. 1, thus inclining the walls of the members 14, placing the same under compression and disposed at such angles as to prevent any possible backward or outward movement of the pipe or tube 16, thus securely retaining said pipe or tube in connection with the coupling 11.

In the operation of mounting the pipe or tube in connection with the body 11 and in flexing the elastic members 14 thereof, it will be understood that the pin-like bodies form a backing, resisting the pressure or compression applied to said members, forming a strong and positive coupling between the parts. In all forms of the construction shown, the strength of the coupling will depend upon the extent of projection of the members 14 with reference to the pin-like body as well as in the thickness of said members and the spacing arrangement thereof or the number employed on a pin body of given length.

It will be understood that my invention is primarily adapted for use in forming strong and durable couplings for structural bodies of any kind or class and especially tubular or pipe-like bodies in the formation or erection of buildings, vehicles, machinery, apparatus or devices of any kind or class regardless of the size, dimension or contour thereof. This applies to the several forms of construction described herein.

Figure 2:
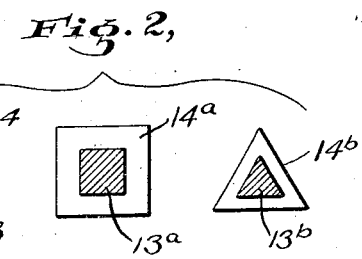
Fig. 2 is a view showing three different cross sectional forms which I may employ in the coupling device.
Figure 3:
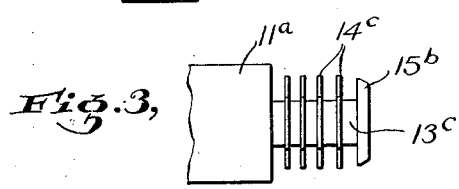
Fig. 3 is a view of a part of the construction shown in Fig. 1 and showing a modification.
Figure 4:
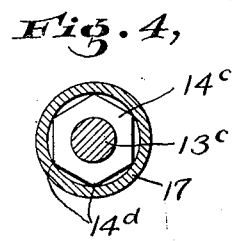
Fig. 4 is a sectional view of the structure seen in Fig. 3.

The coupling 11 shown in Fig. 1 may employ pin-like bodies 13 and coupling members 14 which are of different cross sectional form. In Fig. 2 13 represents the circular form of pin body shown in Fig. 1, and 14 the corresponding form of said members, whereas at 13a, I have shown a rectangular pin body and at 14a rectangular elastic members. At 13b, I have shown a triangular pin body, and at 14b triangular members. In the same manner, the members 14 may be made hexagonal in form as seen at 14c, Figs. 3 and 4 and the pin-like body 13c may be circular or of other cross sectional form. The structure 13a and 14a is designed primarily for use in connection with rectangular pipes or tubes and the structure 13b and 14b is designed for triangular pipe or tubes, while the members 14c may be used in a hexagonal pipe or tube or in a circular pipe or tube 17 as seen in Fig. 4 of the drawings, in which latter case, the corner portions 14d only engage the inner wall of the pipe or tube 17. As seen in Fig. 3 of the drawings, the coupling body 11a, in connection with which the parts 13c and 14c are formed also includes the guide member 15b for guiding the pipe or tube onto the members 14c. As previously stated, the coupling body 11a may be of any desired form.

Figure 5:
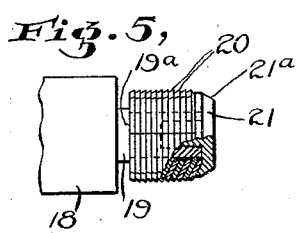
Fig. 5 is a view similar to Fig. 3 and showing another modification, part of the construction being broken away and in section.

In Fig. 5 of the drawings, I have shown another coupling body 18 which differs from the coupling bodies 11—11a in that the pin-like bodies 19 merely serve as means for supporting elastic coupling elements 20 instead of being formed as an integral part of the pin body 19. The innermost element or member 20 seats upon a shoulder 11a on the pin 19, whereas the outermost member 20 is held against displacement by the enlarged head of a screw 21 coupled with the pin 19 and having a beveled surface 21a serving to guide the pipe or tube onto the members 20, the same as the member 15.

Figure 6:
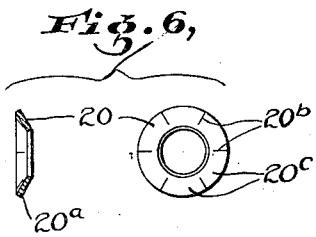
Fig. 6 is a face and sectional view of one of a number of coupling elements employed in Fig. 5.

The members 20 are preferably in the form of conical or substantially conical washers or rings shown in section and in plan in Fig. 6 of the drawings, and being so arranged on the pin 19 that one member nests within the other with the outside diameter or peripheral edges 20a arranged at an inward inclination with reference to the body part 18 of the coupling. With this construction, the movement of a pipe or tube over the peripheral edges 20a which are of greater diameter than the inside diameter of the pipe or tube, will be flexed inwardly to a further degree than the longitudinal inclination, placing said members under compression in this operation. I have also shown the peripheries of the members 20 segmented by radial lines 20b to form independently flexing parts 20c, note Fig. 6, to compensate for any irregularities in comparatively rough or un-smooth surfaces that may exist on the inside wall of a pipe or tube, but my invention is not limited to the use of the separate parts 20c, especially in connection with smooth walls or surfaces.

Figure 7:
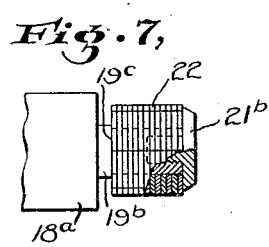
Fig. 7 is a view similar to Fig. 5 showing another modification.
Figure 8:
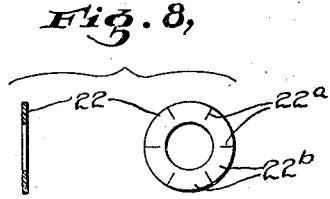
Fig. 8 is a face and sectional view of one of a number of coupling elements employed in Fig. 7.

In Fig. 7 I have shown a coupling body 18a, similar in substantially all respects to the body shown in Fig. 5, and including a projecting pin 19b and a headed screw 21b for retaining a plurality of coupling members or elements 22 in position on the pin 19b outwardly of a shoulder portion 19c. The members 22 are in the form of flat rings or washers as clearly seen in Fig. 8 of the drawings, and these members may also be segmented at the periphery thereof as seen at 22a to form independently flexing members 22b. As will be apparent, the members 22 are normally arranged at right angles to the axis of the pin 19b and are moved into inclined position inwardly in the direction of the body 18a in the mounting of a pipe or tube thereon, the same as shown at the left of Fig. 1 of the drawings, or producing a result substantially similar to that shown in section in Fig. 5 of the drawings.

Figure 9:
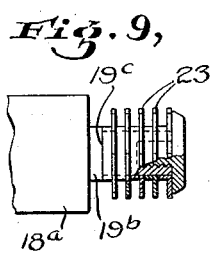
Fig. 9 is a view similar to Figs. 5 and 7, showing another modification.
Figure 10:
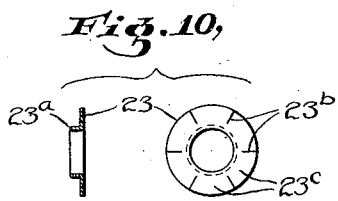
Fig. 10 is a face and sectional view of one of a number of coupling elements shown in Fig. 9.

The structure shown in Fig. 9 differs from that shown in Fig. 7 simply in providing members 23 substituted for the members 22 which have comparatively wide bearings 23a which extend at one side of said members and serve to space the peripheral or extending portions of the members 23 one from the other on the pin 19b. In this construction, the peripheries of the members 23 are also segmented as seen at 23b to form independently flexing members 23c.

It will also be understood that any cross sectional form may be employed in the construction of the members 20, 22 and 23 as well as the formation of the members 14 and 14c as herein stated, and various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. A coupling comprising a metallic pin member and a socket member, the pin having a forward guide portion of slightly less diameter than the internal diameter of the socket member and a plurality of spaced radial metallic fins on said pin situated inwardly from the guide portion and of normally greater diameter than the same and also of greater diameter than the internal diameter of the socket member, the pin adapted to be forcibly inserted into the socket member whereby the fins are flexed slightly to cause a substantial radial pressure against the inner wall of the socket member and thus resist outward movement, the guide portion forming a transverse support against the inner wall of the socket member to resist force tending to break the joint laterally.

2. A coupling comprising a metallic pin member and a socket member the pin having a forward guide portion integral therewith of slightly less diameter than the internal diameter of the socket member and a plurality of spaced radial metallic fins on said pin, and integral therewith, situated inwardly from the guide portion and of normally greater diameter than the same and also of greater diameter than the internal diameter of the socket member, the pin adapted to be forcibly inserted into the socket member whereby the fins are flexed slightly to cause a substantial radial pressure against the inner wall of the socket member and thus resist outward movement, the guide portion forming a transverse support against the inner wall of the socket member to resist force tending to break the joint laterally.

3. A coupling comprising a metallic pin member and a socket member, the pin having forward guide portion of slightly less diameter than the internal diameter of the socket member and a plurality of radial metallic fins on said pin situated inwardly from the guide portion, the peripheries of said fins being divided to form independent elements of normally greater diameter than the guide portion and also of greater diameter than the internal diameter of the socket member, the pin adapted to be forcibly inserted into the socket member whereby the fin elements are flexed slightly to cause a substantial radial pressure against the inner wall of the socket member and thus resist outward movement, the guide portion forming a transverse support against the inner wall of the socket member to resist force tending to break the joint laterally.

In testimony that I claim the foregoing as my invention I have signed my name this 14th day of June, 1928.

HARRY E. SIPE.